(12) United States Patent
Woodall

(10) Patent No.: US 6,594,382 B1
(45) Date of Patent: Jul. 15, 2003

(54) NEURAL SENSORS

(75) Inventor: Roger L. Woodall, Jewett City, CT (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/436,956

(22) Filed: Nov. 4, 1999

(51) Int. Cl.[7] .................. G06K 9/62; G06F 15/18; G06G 7/00
(52) U.S. Cl. .................. 382/156; 382/159; 706/20
(58) Field of Search .................. 382/155, 156, 382/158, 159, 48, 226, 190, 157; 706/15, 16, 20, 22, 23, 41, 43, 52

(56) References Cited

U.S. PATENT DOCUMENTS

| | | | | |
|---|---|---|---|---|
| 5,263,097 A | * | 11/1993 | Katz et al. .................. | 382/48 |
| 5,524,065 A | * | 6/1996 | Yagasaki .................. | 382/226 |
| 5,680,481 A | * | 10/1997 | Prasad et al. .................. | 382/190 |
| 5,687,291 A | * | 11/1997 | Smyth .................. | 395/10 |
| 5,842,194 A | * | 11/1998 | Arbuckle .................. | 706/52 |
| 5,850,470 A | * | 12/1998 | Kung et al. .................. | 382/157 |
| 6,038,338 A | * | 3/2000 | Nguyen .................. | 382/159 |

* cited by examiner

*Primary Examiner*—Jon Chang
*Assistant Examiner*—Brian Le
(74) *Attorney, Agent, or Firm*—James M. Kasischke; Michael F. Oglo; Jean-Paul A. Nasser

(57) ABSTRACT

A neural sensor is provided which receives raw input data defining a pattern, such as image or sound data, and generates a classification identifier for the pattern. The neural sensor has a pattern array former which organizes the raw input data into the proper array format. A first order processing section receives the pattern array and generates a first order feature vector illustrative of first order features of the input data. A second order processing section also receives the pattern array and generates at least one second order feature vector illustrative of gradients in the input data. A vector fusion section receives the feature vectors from the first and second order processing sections and generates a single fused feature vector which is provided to a pattern classifier network. The pattern classifier network, in turn, generates a pattern classification for the input data.

16 Claims, 6 Drawing Sheets

NEURAL SENSORS

CROSS-REFERENCE TO RELATED APPLICATION

This patent application is co-pending with related patent application Ser. No. 09/436,957 entitled Neural Directors by the same inventor as this patent application.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

(1) Field of the Invention

The present invention relates generally to the field of electronic neural networks, and more particularly to a new architecture for neural networks having a plurality of hidden layers, or multi-layer neural networks, and further to new methodologies for providing supervised and unsupervised training of neural networks constructed according to the new architecture.

(2) Description of the Prior Art

Electronic neural networks have been developed to rapidly identify patterns in certain types of input data, or to accurately classify the input patterns into one of a plurality of predetermined classifications. For example, neural networks have been developed which can recognize and identify patterns, such as the identification of hand-written alphanumeric characters, in response to input data constituting the pattern of on/off picture elements, or "pixels," representing the images of the characters to be identified. In such a neural network, the pixel pattern is represented by, for example, electrical signals coupled to a plurality of input terminals, which, in turn, are connected to a number of processing nodes, or neurons, each of which is associated with one of the alphanumeric characters which the neural network can identify. The input signals from the input terminals are coupled to the processing nodes through certain weighting functions, and each processing node generates an output signal which represents a value that is a non-linear function of the pattern of weighted input signals applied thereto. Based on the values of the weighted pattern of input signals from the input terminals, if the input signals represent a character which can be identified by the neural network, one of the processing nodes which is associated with that character will generate a positive output signal, and the others will not. On the other hand, if the input signals do not represent a character which can be identified by the neural network, none of the processing nodes will generate a positive output signal. Neural networks have been developed which can perform similar pattern recognition in a number of diverse areas.

The particular patterns which the neural network can identify depend on the weighting functions and the particular connections of the input terminals to the processing nodes, or elements. As an example, the weighting functions in the above-described character recognition neural network essentially will represent the pixel patterns which define each particular character. Typically, each processing node will perform a summation operation in connection with the weight values, also referred to as connection values or weighting values, representing the weighted input signals provided thereto, to generate a sum that represents the likelihood that the character to be identified is the character associated with that processing node. The processing node then applies the non-linear function to that sum to generate a positive output signal if the sum is, for example, above a predetermined threshold value. The non-linear functions which the processing nodes may use in connection with the sum of weighted input signals are generally conventional functions, such as step functions, threshold functions, or sigmoids. In all cases the output signal from the processing node will approach the same positive output signal asymptotically.

Before a neural network can be useful, the weighting functions for each of the respective input signals must be established. In some cases, the weighting functions can be established a priori. Normally, however, a neural network goes through a training phase, in which input signals representing a number of training patterns for the types of items to be classified (e.g., the pixel patterns of the various hand-written characters in the character-recognition example) are applied to the input terminals, and the output signals from the processing nodes are tested. Based on the pattern of output signals from the processing nodes for each training example, the weighting functions are adjusted over a number of trials. Once trained, a neural network can generally accurately recognize patterns during an operational phase. The degree of success is based in part on the number of training patterns applied to the neural network during the training stage and the degree of dissimilarity between patterns to be identified. Such a neural network can also typically identify patterns which are similar, but not necessarily identical, to the training patterns.

One of the problems with conventional neural network architectures as described above is that the training methodology, generally known as the "back-propagation" method, is often extremely slow in a number of important applications. Also, under the back-propagation method, the neural network may provide erroneous results which may require restarting the training. In addition, even after a neural network has been through a training phase, confidence that the best training has been accomplished may sometimes be poor. If a new classification is to be added to a trained neural network, the complete neural network must be retrained. Further, the weighting functions generated during the training phase often cannot be interpreted in ways that readily provide understanding of what they particularly represent.

SUMMARY OF THE INVENTION

Accordingly, it is an object of the present invention to provide a new and improved neural network architecture for use in pattern recognition in which the weighting functions are determined a priori.

Other objects and advantages of the present invention will become more obvious hereinafter in the specification and drawings.

In accordance with the present invention, a new neural network architecture, referred to hereinafter as a neural sensor, is part of a new neural network technology that is constructed rather then trained. Since the words "neural networks" often connote a totally trainable neural network, a constructed neural network is a connectionist neural network device that is assembled using common neural network components to perform a specific process. The constructed neural network assembly is analogous to the construction of an electronic assembly using resistors, transistors, integrated circuits and other simple electronic parts. A constructed neural network is fabricated using common neural network components such as processing elements (neurons), output functions, gain elements, neural network connections of certain types or of specific values and other artificial neural network parts. As in electronics, the design goal and the laws of nature such as mathematics, physics, chemistry, mechanics, and "rules of thumb" are used to govern the assembly and architecture of a constructed neural network. A constructed neural network, which is assembled for a specific process without the use of training, can be considered equivalent to a trained neural network having accomplished an output error of zero after an infinite training sequence. Although there are some existing connective circuits that meet the design criteria of a constructed neural network, the term "constructed neural network" is used herein to differentiate this new neural technology which does not require training from the common neural network technology requiring training.

Constructed neural networks can be embodied in analog or digital technologies, or in software. Today one can find a blurring between the boundaries of analog and digital technologies. Some of the classic analog processing is now found in the realm of digital signal processing and classic digital processing is found in analog charged couple devices and sample and hold circuits especially in the area of discrete time signals and shift registers.

One of the components utilized in constructing a neural sensor is a neural director. In brief, a neural director receives an input vector X comprising "I" input components $X_i$ and generates in response thereto, an output vector Y comprising "J" output components $Y_j$, where "I" and "J" are the neural director's input and output dimensions. The neural director has an input processing node layer comprised of "I" processing nodes and an output processing node layer comprised of "J" processing nodes. Each output processing node receives the outputs from the input processing nodes to which a weighting value w(i,j) has been applied and generates one of said output components $Y_j$ representing a linear function in connection therewith. The weighting values w(i,j) contain a unique internal representation of a uniform spatial distribution.

A neural director can be constructed to be one of two types, designated type 1 or type 2. The two types differ in what may be termed "spatial linearity". In addition to classic linearity, i.e., the use of non-linear weighting functions in the neural circuit, spatial linearity includes a "linearity in space". In a fully populated single layer neural network which has "I" input processing nodes and "J" output processing nodes, each of the output processing nodes will contain "I" weight values. The "I" weight values of each processing node can be considered a vector of "I" components in an "I" dimensional space. One of the many important characteristics of a constructed neural network is that a classification of an input pattern is greatly defined by a vector's direction in a multidimensional space. Thus, spatial linearity/nonlinearity affects the internal process of a neural sensor. An angular relationship between input and output vector pairs can be used to define the spatial linearity. A network is linear in space when the angles between all different vector pairs are the same in the output space as they are in the input space regardless of the dimensionalities of the spaces. A network is nonlinear if it is either classically and/or spatially nonlinear. A spatial nonlinearity causes an input vector pair to diverge in direction in the output space and is analogous to a system nonlinearity in chaos theory where two similar initial condition points diverge over time. A neural director type 1 is linear in both its neural circuit, i.e., classically linear, and in its space, i.e., spatially linear. Generally, a neural director type 2 is classically linear but spatially nonlinear, though it will be understood that either classic or spatial nonlinearity will result in a neural director type 2. When compared to a neural director type 1 of the same input and output dimensions, a neural director type 2 nonlinearly shifts an input vector away from the output direction which one would anticipate using the neural director type 1. A neural director type 2 produces a nonlinear gradient between two poles in its multidimensional output space, one pole lying in the center of a sub space that is directed by all positive elements and the other pole being the opposite polarity.

Spatial nonlinearity is a parameter for a constructed neural network connectionist device which affects the recognition differentiation between similar input patterns. Reduced to its most basic concept, a constructed neural network senses features from a specific input pattern to provide a deterministic direction through a connecting circuit as a feature vector. This deterministic direction in a multidimensional space is the information that is used for the recognition and classification of the pattern. The spatial nonlinearities of the type 2 neural director provide a process that allows the discrimination of finer details in the recognition of an input pattern. Spatial nonlinearity is the result of a deterministic change in a vector's direction in its multidimensional space relative to its intended direction in a linear space. The dimensionalities between these spaces may be different or the same. While most conventional neural networks demonstrate a spatial nonlinearity, their spatial nonlinearity is primarily caused by the use of nonlinear neural neurons.

The neural director type 1 has several advantages in performing different operations depending upon its application in a network. A neural director type 1 has the ability to linearly transform a vector from one set of dimensions to the same or that of another set of dimensions. The type 1 neural director can fuse separate data paths into a single vector as each output element of the vector contains a composition of all input elements of the input data. The type 1 neural director may also distribute input data into different layers of like data and can expand its input data into higher dimensions, where the input data can be sensed at a higher resolution than it can in its lower dimension. Although the dimensions are not totally independent, the dimensional independency can be increased when the type 1 neural director is coupled with a spatially nonlinear device. The neural director type 1 can represent a generalized matched filter which contains all possible combinations of input patterns due to its distributed connection set. The type 1 neural director can linearly expand input data or can use nonlinear output functions, which when applied to a conventional neural network in lieu of the original data will make the conventional network learn faster. Depending on the resolution chosen for the internal representation of the uniform spatial distribution, a neural director type 1 may be called a "near" ideal neural director type 1. A near ideal neural director type 1 remains linear in its neural circuit but it is slightly nonlinear in space because the position of a vector in the neural director's output space will be altered relative to the vector's ideal position in a linear space. Used in a multilayer neural director, the near ideal neural director type 1, without other nonlinearities, increases the recognition resolution of similar input patterns.

The neural sensor utilizes combinations of neural directors and other neural network components to form a pattern array former, first and second order feature processors, a feature fusion processor and a pattern classification network. The pattern array former organizes the raw input data into the proper array format for use in the first and second order feature processors. The first order feature processor receives the formatted data from the array former and generates in response a first order feature vector illustrative of first order features of the input data. The first order feature processor includes a neural director which generates the first order feature vector to have a greater dimensionality than the input data. The greater dimensionality aids in discriminating between similar patterns in the input data. The second order feature processor also receives formatted data from the array former and generates in response at least one second order feature vector illustrative of gradients in the input data, where each gradient contains multiple local frequency or spatial frequency data depending on the form of the raw input data. The second order feature processor includes at least one neural director that generates the second order feature vector to have a greater dimensionality than the gradient, aiding in discriminating between similar patterns in the gradient. The feature fusion processor receives the first and second order feature vectors from the first and second order feature processors and generates a single fused feature vector. The pattern classification network receives the fused feature vector and generates in response a pattern classification.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
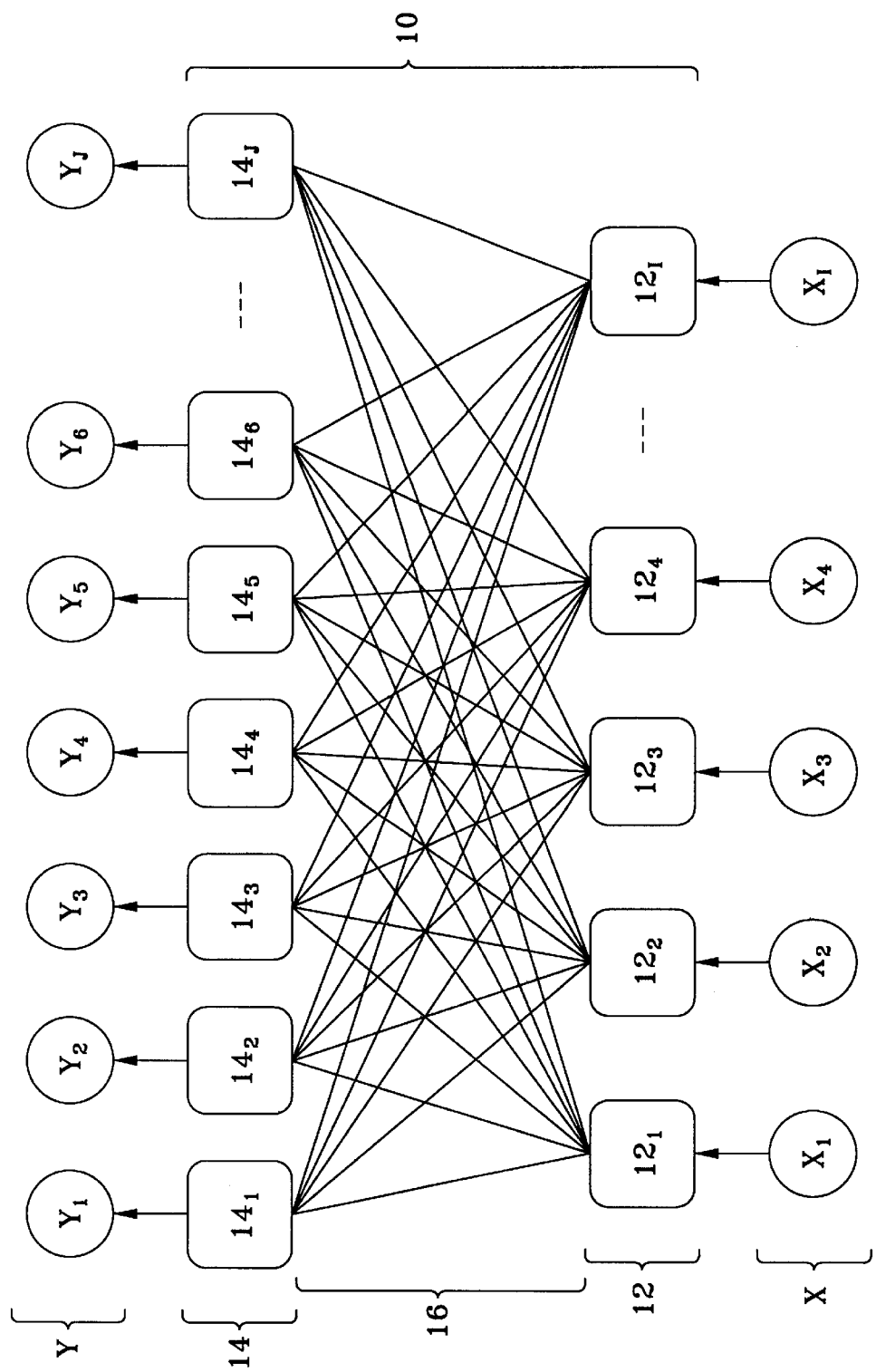
FIG. 1 is a general or neural schematic illustrating a fully populated neural director.

Referring now to FIG. 1, there is shown a general neural schematic illustrating a neural director 10 constructed in accordance with the invention. Neural director 10 includes an input processing node layer 12, an output processing node layer 14 and a set of connections, or weighting set w(i,j), shown as 16 in FIG. 1. An input vector X includes a plurality of input signals $X_1$ through $X_I$, comprising components $X_i$ of the input vector X. Input processing node layer 12 has a corresponding plurality of input processing nodes $12_1$ through $12_I$, each input processing node $12_i$ receiving corresponding input signal $X_i$.

Each node $12_i$ of the input processing node layer 12 generates a processed signal which it couples to each one of a plurality of output processing nodes $14_1$ through $14_J$, as indicated by weighting set 16. The number "I" of input processing nodes $12_i$ and the number "J" of output processing nodes $14_j$ are the input and output dimensions of the neural director 10. In general, the value of "J" is equal to or greater than the value of "I". The processed signals generated by each input processing node $12_i$ represent a value reflecting a predetermined linear function of the input signal $X_i$. All of the input processing nodes $12_i$ preferably use the same linear function, but apply different weighting values to the function in accordance with the weighting set w(i,j) 16.

Each output processing node $14_j$ of the output processing node layer 14 also generates an output signal $Y_j$, comprising the output vector elements $Y_1$ through $Y_J$ of output vector Y. Each output processing node $14_j$ effectively receives the weighted values of processed signals from the input processing nodes $12_i$ connected thereto according to the weighting set w(i,j) 16, generates a sum of the weighted values and generates in response to the sum an output signal $Y_j$ representing a value reflecting a function of the generated sum. All of the output processing nodes $14_j$ use the same function, but the function used by the output processing nodes $14_j$ may differ from the linear function used by the input processing nodes $12_i$.

As described above, the neural director 10 is constructed, rather than trained as in a conventional neural network. Accordingly, the weighting set w(i,j) 16 is determined a priori, and not in relation to any training data. As noted above, the input signals received into processing node layer 12 may be viewed as a vector X, having components $X_i$, which is a vector of "I" dimensions. Similarly, the outputs provided by the output processing node layer 14 may be viewed as a vector Y having components $Y_j$, which is a vector of "J" dimensions where "J" is equal to or greater than "I". Each of the output processing nodes $14_j$ contains an "I" dimensional vector of weighted values, thus all the weighted values in the neural director 10 can be represented by a "J" array of "I" dimensional vectors, or the weighting set w(i,j) 16.

An "I" dimensional vector of weight values for a typical input processing node $12_i$ is in a normalized form of a unit vector. Each of the represented unit vectors has a specific relationship relative to its nearest neighboring unit vectors: the cosine of the angle between any two adjacent or nearest neighbor vectors is a constant. These nearest neighbor vector requirements will produce a neural director 10 with a weighting set w(i,j) 16 that has the same values as a set of "J" unit vectors of "I" dimensions which are uniformly distributed throughout an "I" dimensional unit sphere. Each input processing node $12_i$ is associated with a common dimension "i" of the weighting set w(i,j) 16.

The neural director 10 weight values of the weighting set w(i,j) 16 contain a unique internal representation for a relative spatial distribution. The weighting set w(i,j) 16 for neural director 10 with an "I" input dimension and a "J" output dimension is given as:

$$w(i,j)=ka(i,j)|S^*, \tag{1}$$

where a(i,j) is a "J" dimensional array of unit vectors of "I" dimensions;

k is a constant which represents a non unit vector magnitude of a weighting set w(i,j) 16 as compared to the vector set a(i,j); and

|S* is defined as a symbol to represent the uniform distribution of the "J" unit vectors throughout a unit sphere of "I" dimensions.

Thus the cosine value between any two adjacent unit vectors is a constant everywhere in the unit sphere. The cosine test is a metric to measure the uniformity of the distribution. For a typical k value of one, w(i,j)=a(i,j). Thus the weight values to an output processing node "j" are the same numerical values as the "i" elements of the appropriate "j" unit vector.

A neural director that contains equal input and output dimensions has an additional requirement in its construction, the additional requirement being a coordinate axis shift between the input space and the output space. The coordinate axis shift is defined by the following description. The position of the first output coordinate axis is at a 45 degree angle relative to any and each pair of input coordinate axes. The remaining output coordinate axes are all orthogonal to said first output coordinate axis.

A general outline for the design of an "I" input dimension and a "J" output dimension neural director 10 is to fully pack a unit sphere with unit vectors of "I" dimensions. A packing cosine is chosen to produce an optimum high packing density with a minimum size of the array of vectors packed. When the sphere is judged "fully packed" the array of vectors is saved to allow an at least one iteration of vector selection. An input of a culling cosine parameter is used to estimate the correct final density of the "J" vectors in the unit sphere. A unit vector from the packed array is chosen and all unit vectors lying within the culling cosine value of the chosen unit vector are culled, or deleted from the packed array. The nearest remaining unit vector is chosen, culling about that vector is performed and the process is repeated until no remaining vector lies within the culling cosine value of any other remaining vector. Values for the culling cosine can be iteratively chosen until the remaining vectors produce the uniform distribution required by the design of the neural director.

Figure 2:
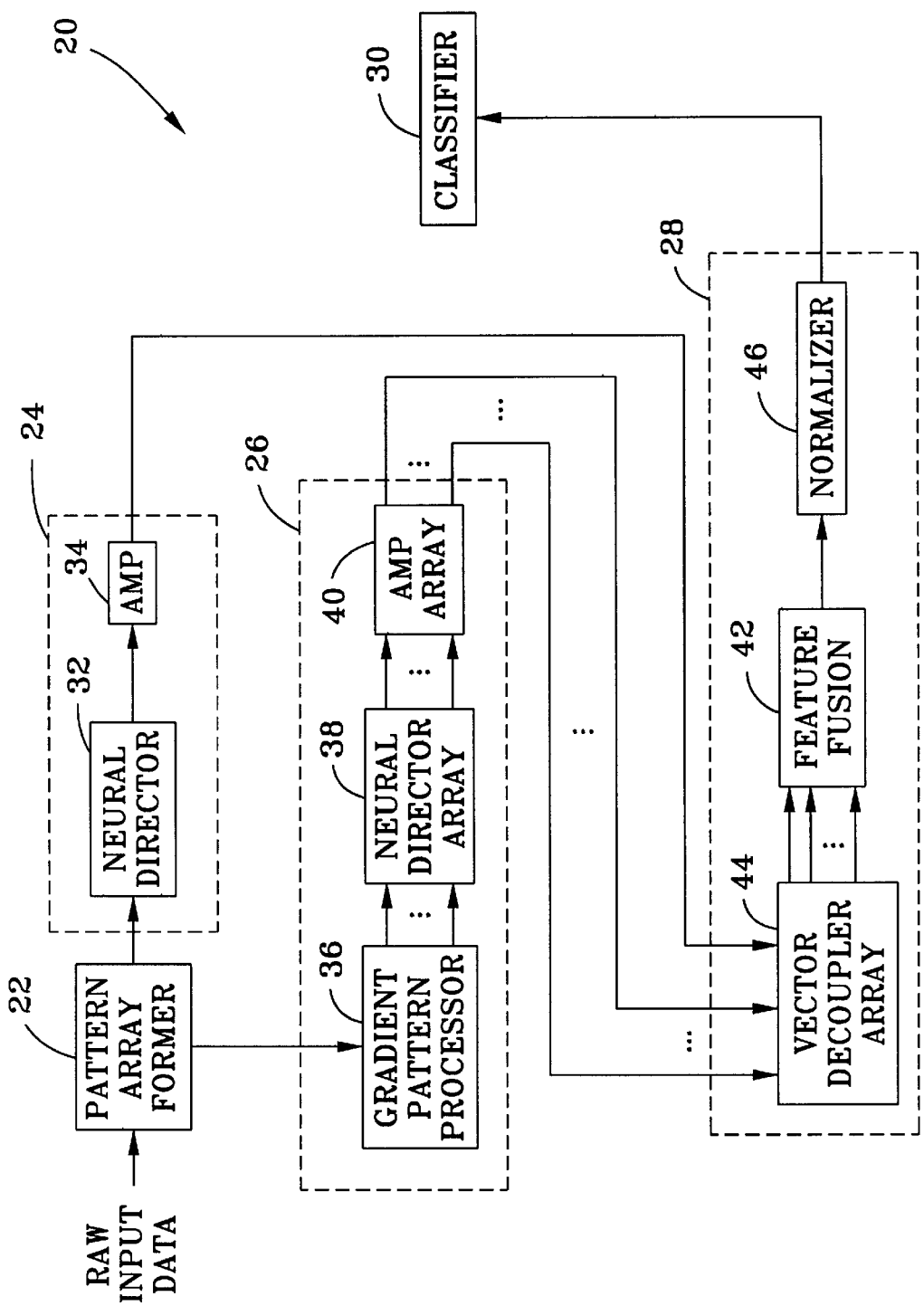
FIG. 2 is a functional block diagram of an illustrative neural sensor constructed in accordance with the invention.

Referring now to FIG. 2, a block diagram of general neural sensor 20 is shown. The neural sensor 20 receives input data in the form of unpreprocessed real world data, or raw input data, which defines a pattern, e.g., image data or sound data, and generates as an output a classification identifier for the pattern. Neural sensor 20 senses patterns in the raw input data which, through the constructed neural network architecture of neural sensor 20, determine a direction of a feature vector in a multidimensional space, the direction being the information contained in the classification identifier. The input data may be a one, two, or multi-dimensional pattern of data relative to an instant of time. The dimensionality of the input pattern is dependent upon the specific architecture of the neural sensor, e.g., an image pattern may include coordinate, color, and intensity data for each pixel of the image. In the block diagram of FIG. 2, pattern array former 22 of neural sensor 20 organizes the raw input data into the proper array format for use in the neural sensor. The configuration of array former 22 depends on the specific embodiment of the neural sensor as will be described below. Neural sensor 20 also includes two sections, a first order processing section 24 and a second order processing section 26, both of which receive the pattern array from array former 22 and generate feature vectors illustrative of features of the input data being classified. In addition, neural sensor 20 includes vector fusion section 28 which receives the feature vectors from the first and second order processing sections 24 and 26 and generates a single fused feature vector which is provided to pattern classifier network 30. Pattern classifier network 30, in turn, generates a pattern classification for the input data. Generally, processing sections 24 and 26, together with fusion section 28, increase input data dimensionality for improved pattern sensitivity. Pattern classifier network 30 reduces the data dimensionality into a specific class.

First order processing section 24 includes first order neural director 32. Neural director 32 generates an output vector which has an increased dimensionality from the vector representing the pattern array, which aids in discriminating between similar patterns. Depending on the specific embodiment, first order amplifier 34 may be provided to generate an amplified vector with a selected gain ratio in connection with second order processing section 26 as will be described below.

In parallel with first order processing section 24, second order processing section 26 receives the pattern array from array former 22. Second order processing section 26 includes gradient pattern processor 36 and neural director array 38. When amplifier 34 is provided in first order processing section 24, second order processing section 26 will include amplifier array 40, corresponding to neural director array 38. In general, gradient pattern processor 36 forms gradient vectors from the elements of the pattern array. The gradient vector for each element reflects selected differences, or gradients, between that element and its neighboring elements, each gradient containing multiple local frequency or spatial frequency data depending on the form of the raw input data. The number of neighboring elements used to form the gradient vector as well as the differences selected will depend on the specific embodiment of the neural sensor and the structure of the pattern array. The total number "S" of gradient vectors formed generally corresponds to the number of elements in the pattern array. Neural director array 38 has a corresponding number of neural directors, such that each neural director of neural director array 38 is coupled to one gradient vector. As with neural director 32, the outputs of the neural directors of array 38 have an increased dimensionality from their input gradient vectors, which aids in discriminating between similar gradients.

First order amplifier 34 and amplifier array 40 may be used in order to balance the output vectors from processing sections 24 and 26, such that neither section dominates the input to fusion section 28. If the gain ratio of first order amplifier 34 is taken as $k\lambda$, then the gain ratio for each amplifier in amplifier array 40 will be a complimentary gain ratio, $k(1-\lambda)$, where k is a constant. Amplifiers 34 and 40 essentially multiply the vectors received from their respective neural directors by their respective gain ratios.

The output vector from first order processing section 24 represents features in the input pattern and the output vectors from second order processing section 26 represent features in the gradients in the input pattern. All of the output vectors are coupled to vector fusion section 28, which fuses the output vectors into a single feature vector for provision to the pattern classifier 30. Pattern classifier 30 may be any one of a number of neural networks used in pattern recognition, such as a classic trainable neural network, a neural director, or some other form of memory processor. For example, a classic trainable neural network would be trained to recognize the feature vector from fusion section 28 as a unique pattern of input data.

Figure 3A:
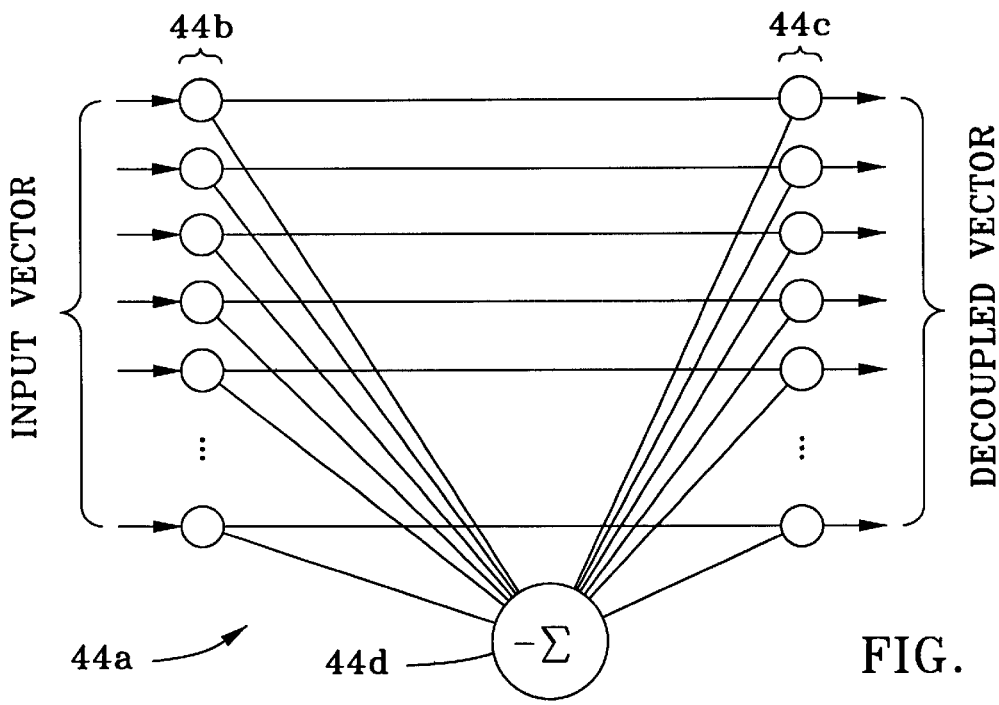
FIG. 3a is a neural schematic illustrating a vector decoupler.

Fusion section 28 includes feature fusion neural director 42, and may also include vector decoupler array 44 and vector normalizer 46. Feature fusion neural director 42 is a standard neural director as described above, having the separate feature vectors as its input array "X" and a fused feature vector as its output array "Y", the fusion being the coupling of each input element with all output elements via the weighting set w(i,j), as is standard for a neural director. Vector decoupler array 44 serves to adjust the values of each feature vector received from processing sections 24 and 26 by removing any fixed offset which may have been present in the input data. For example, an image on an artificial retina may produce a signal output for each pixel in proportion to the intensity of the local area of the image. Classically, each output is a uni-polar signal, i.e., zero for black (full dark) and a maximum value for white (full light). The image information is contained in the variance of the signal array, or vector, and not the absolute values of the signal array. If the average signal of all pixels is subtracted from each pixel of the signal array, the array information becomes the variance of the image information. Vector decoupler array 44 provides this process in a constructed neural network. Referring now to FIG. 3a, a neural schematic for one decoupler 44a of decoupler array 44 is shown. Decoupler 44a essentially comprises a plurality of decoupler input elements 44b, a corresponding plurality of decoupler output processing elements 44c and averaging element 44d. Each connection value between decoupler input processing elements 44b and averaging element 44d is equal to the inverse of the number of elements in the input vector for decoupler 44a. Thus averaging element 44d receives and sums the element value multiplied by this inverse value from each input element 44b, the output of averaging element 44d having a negative function, thus being the average negative element value. Decoupler output processing elements 44c sum the negative average provided by averaging element 44d from the component values provided by the decoupler input processing elements 44b to output the components of a decoupled vector.

Figure 3B:
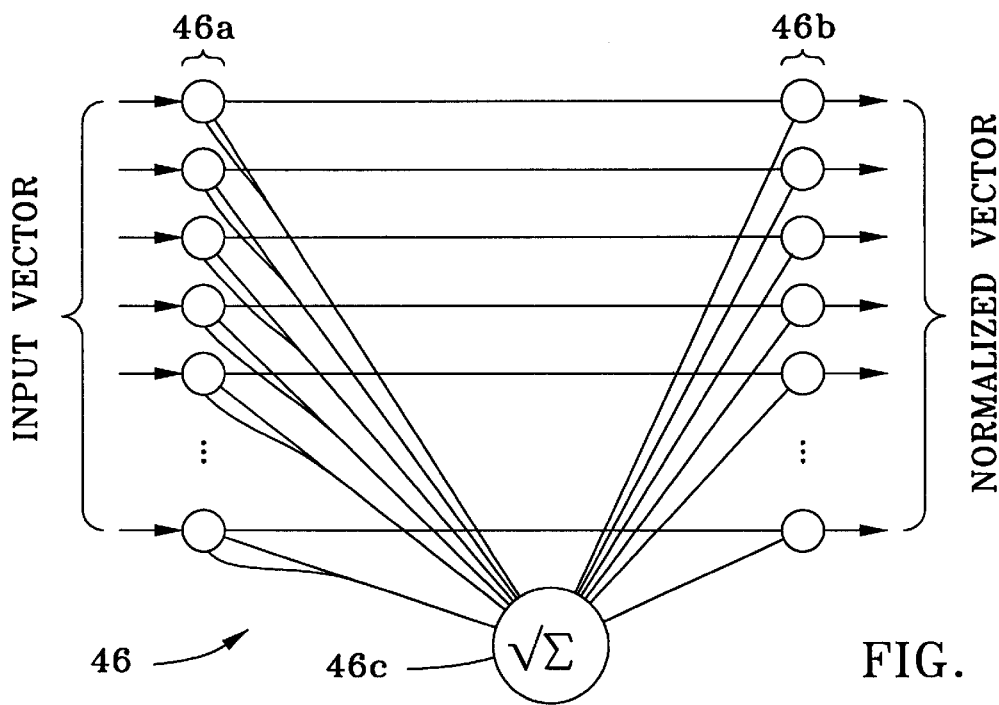
FIG. 3b is a neural schematic illustrating a vector normalizer.

Referring now to FIG. 3b, a neural schematic of normalizer 46 is shown. Normalizer 46 has a structure similar to decoupler 44a. Normalizer 46 comprises a plurality of normalizer input elements 46a and a corresponding plurality of normalizer output processing elements 46b. However, the averaging element 44d of decoupler 44a is replaced with normalizer element 46c. Each normalizer input processing element 46a of normalizer 46 passes a component value of its input vector to a normalizer output processing element 46b and also to normalizing element 46c. The connections between input elements 46a and normalizing element 46c are well known sigma-pi connections so as to provide the square of each element value to normalizing element 46c, which sums the squares. The output function of normalizing element 46c obtains the square root of the sum and controls the output function of output processing elements 46b, for an output gain inverse to the normalizing element 46c. The input processing element values are thereby changed such that output processing elements 46b output the components of a normalized vector.

Figure 4:
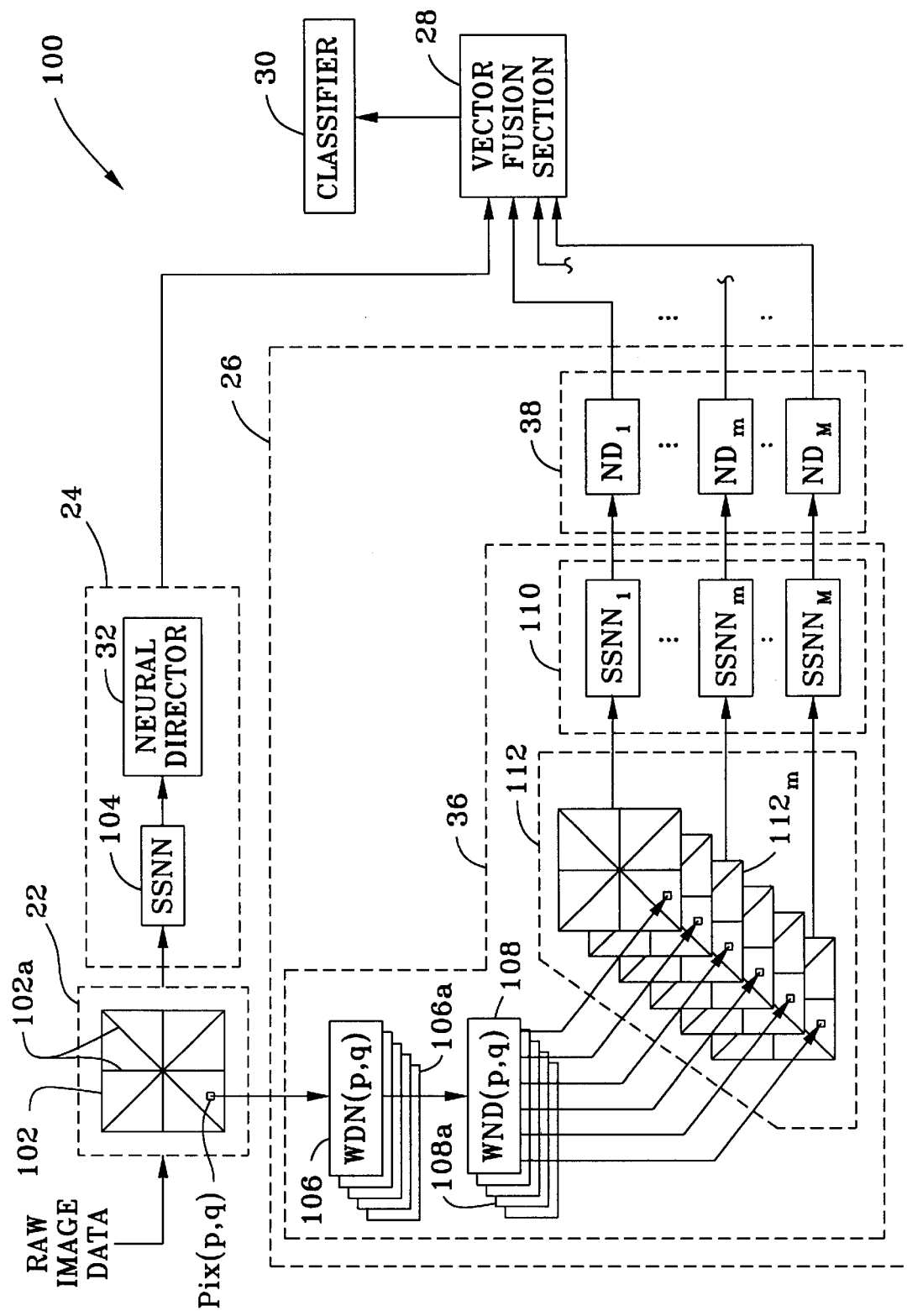
FIG. 4 is a neural schematic illustrating a visual sensor embodiment of the present invention.

The structure and operations of the various elements of the neural sensor depicted in FIG. 2 will be made clear in connection with the illustrative neural sensors described in connection with FIGS. 4 through 7. Referring now to FIG. 4, there is shown a schematic depiction of a foveating retina structure of a virtual retina, or visual sensor 100. Visual sensor 100 converts a two dimensional optical image into a multi-dimensional feature vector for recognition and classification. Pattern array former 22 comprises an array of photo transducers which converts optical patterns into patterns of data, corresponding to an array of pixels, indicated as pixel array 102 in FIG. 4, which form the image. The centroid of the image, i.e., the centroid of the spatial light pattern, is placed at the central pixel of array 102. Pattern former 22 further divides array 102 into "N" sectors, illustrated by lines 102a in FIG. 4, for processing by first and second order processors sections 24 and 26. For visual sensor 100, first order processor section 24 comprises first order spatial sum neural network (SSNN) 104 in addition to neural director 32. It is noted that amplifiers 34 and 40 are not used in this embodiment of visual sensor 100, but could be applicable to other embodiments of a visual sensor. SSNN 104 contains "N" summing neurons each corresponding to one of the sectors of array 102. Each summing neuron generates an output value, or Sector Value (SV), for its sector n, $SV_n$, by summing the activities of all pixels in its corresponding sector through weighted connections in which the weight value is relative to the pixel's position in the sector, i.e., $$SV_n = \sum_{p=1}^{P} \sum_{q=1}^{Q} R \frac{Pix(p, q)}{D(p, q)}, \qquad (2)$$

where:

P and Q are the dimensions of array 102;

Pix(p,q) corresponds to the pixel value of the pixel at location p,q in array 102;

D(p,q) corresponds to the distance from the central pixel of array 102, or fovea centralis, to Pix(p,q); and R is a scale constant which is taken as zero for those pixels not within the sector, thus the Sector Value includes only the sum of values for pixels within the sector. The Sector Value outputs of SSNN 104 are provided to neural director 32 as described for the output of pattern array former 22 of FIG. 2.

Gradient pattern processor 36 of visual sensor 100 comprises window difference network (WDN) 106, window neural director (WND) 108 and SSNN array 110. For each pixel, Pix(p,q) of array 102, WDN 106 generates a difference, or gradient vector consisting of the gradients between the value of Pix(p,q) and the value of each of its surrounding pixels within a chosen window of L×L pixels, where Pix(p,q) lies at the center of the window. The gradient information surrounding each Pix(p,q) contains multiple spatial frequencies and image pattern orientation information for the window of L×L pixels. Thus, WDN 106 has S input values of dimension L×L and S gradient vector outputs of dimension (L×L)−1, one input value and one vector output for each Pix(p,q). While, for simplicity of description, the chosen window has been described as an array of L×L pixels, it is to be noted that a circular, or any other convenient shape, may be used. WDN 106 can be constructed as a single network, but for ease of visualization WDN 106 can be thought of as an array of networks WDN(p,q), each corresponding to one pixel of array 102. Similarly, WND 108 can be thought of as an array of neural directors, WND(p,q), each receiving one gradient vector output corresponding to one pixel of array 102. Each neural director WND(p,q) thus has an input dimension of (L×L)−1, corresponding to the gradient vector dimension, and an output dimension corresponding to a desired number "M" of feature layers 112. It can be seen WND(p,q) populates a space in each feature layer $112_m$ corresponding to Pix(p,q).

In FIG. 4, this configuration is illustrated for Pix(p,q), the WDN 106 array being illustrated by lines 106a and the WND 108 array being illustrated by lines 108a. The outputs of WND(p,q) are shown distributed to a space in each of "M" feature layers 112 corresponding to the location of Pix(p,q) in array 102. In the visual sensor context, feature layers 112 can be thought of as representing visual features such as boundary edges and horizontal, vertical, or diagonal lines. Feature layer $112_m$ may, for example, contain information on horizontal lines within the image, with the space corresponding to those pixels having a likelihood of containing a horizontal line being given values in proportion to that likelihood.

Feature layers 112 are divided into sectors corresponding to the sector divisions of array 102. Each $SSNN_m$ of SSNN array 110 operates on its corresponding feature layer as previously described for SSNN 104 of first order processing section 24 operating on array 102, generating Sector Values for each sector of its feature layer $112_m$. Feature layers 112 are shown in FIG. 4 to provide an easier understanding of the internal process within gradient processor 36. Gradient processor 36 shares a common process with the visual area of the mammalian brain. Each feature layer $112_m$ can be thought of as having an analogous representation of neurons in the brain which have an orientation sensitivity, and each feature layer $112_m$ contains a different orientation sensitivity. Each Pix(p,q) in a feature layer $112_m$ sensing an identical image edge orientation within its associated window contains an identical proportional value representing identical orientation sensitivities. In actuality, connections having a weighted value of $SV_n$ for Pix(p,q) are made between WND(p,q) and a sum neuron in SSNN array 110. The outputs of SSNN array 110 are provided to neural director array 38 as described for gradient pattern processor 36 of FIG. 2. Visual sensor 100 further includes vector fusion section 28 and classifier 30 as described for general neural sensor 20 of FIG. 2.

Figure 5:
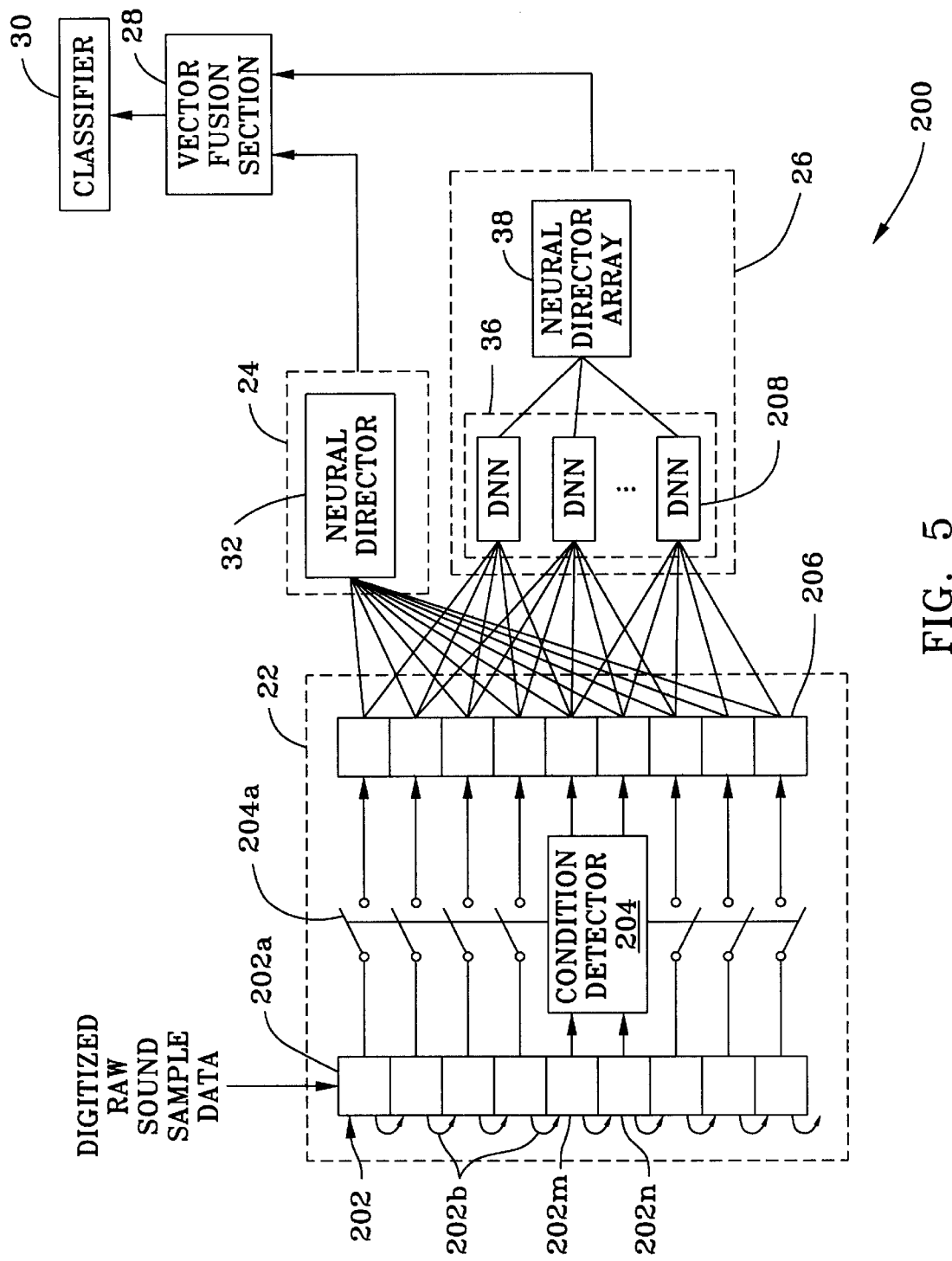
FIG. 5 is a neural schematic illustrating a sound sensor embodiment of the present invention.

Referring now to FIG. 5, there is shown a schematic depiction of the pattern former array 22 and gradient pattern processor 36 of sound sensor 200. The remaining components of sound sensor 200 are as described for general neural sensor 20 of FIG. 2, noting that amplifiers 34 and 40 are not used in this embodiment of sound sensor 200. Sound sensor 200 converts an instant of sound into a multi-dimensional feature vector for recognition and classification. Pattern array former 22 of sound sensor 200 receives digitized raw sound sample data into shift register 202. As each additional sound sample is received into input end 202a of register 202, previously received sound sample data is shifted through register 202 (downwardly in FIG. 5 as indicated by arrows 202b). Condition detector 204, such as a zero-crossing detector, tests samples from two adjacent locations in shift register 202, which are representative of the sound data from two consecutive samples. If the samples in the adjacent locations meet selected criteria, the data in shift register 202 is transferred in parallel, as symbolized by series of switches 204a, to window register 206. For example, the selected criteria indicating a zero-crossing of the sound signal samples may be the sound sample data at locations 202m and 202n having different signs. Other criteria may be selected, such as the positive and/or negative zero-crossover of the derivative of the time series, i.e., the areas of the input waveform, having a slope of zero. Window register 206 is coupled to neural director 32 of first order processing section 24 and to gradient pattern processor 36 of second order processing section 26. Gradient pattern processor 36 for sound sensor 200 comprises a number of delay difference neural networks (DNN) 208. Each delay DNN 208 receives a group of consecutive sound sample data values from window register 206. The number of sound sample data values may vary between individual delay difference neural networks 208. Each delay DNN 208 selects one of its consecutive sound samples as a reference sound sample, e.g., the sound sample in the center of the consecutive group. Delay DNN 208 generates, in response, a difference vector, each element corresponding to the value of one the group of sound samples minus the value of the selected reference sample. The difference vector from each delay DNN 208 is provided to corresponding neural directors of neural director array 38. It will be appreciated that sound sensor 200 performs the above-described operations repetitively, whenever condition detector 204 determines that the sound sample data in shift register 202 satisfies the selected criteria.

It can be seen that the configuration of sound sensor 200 can be adapted for use in other neural sensors. For example, window register 206 may contain momentary data input from an array of chemical, taste, or smell sensing elements, or it may contain a set of positional, rotational and/or extensional data elements for the mapping and recognition of a robotic arm's work space. Additionally, window register 206 may contain a binary word, with each element of window register 206 containing at least one bit of the binary word. It will also be appreciated that in these examples, shift register 202 and condition detector 204 would not be required. The connections of window register 206 to DNN 208 would also be varied, depending on the specific sensor application. However, the basic operation of each DNN 208, i.e., choosing a reference value and generating a difference vector for each of its inputs, would remain the same.

Figure 6:
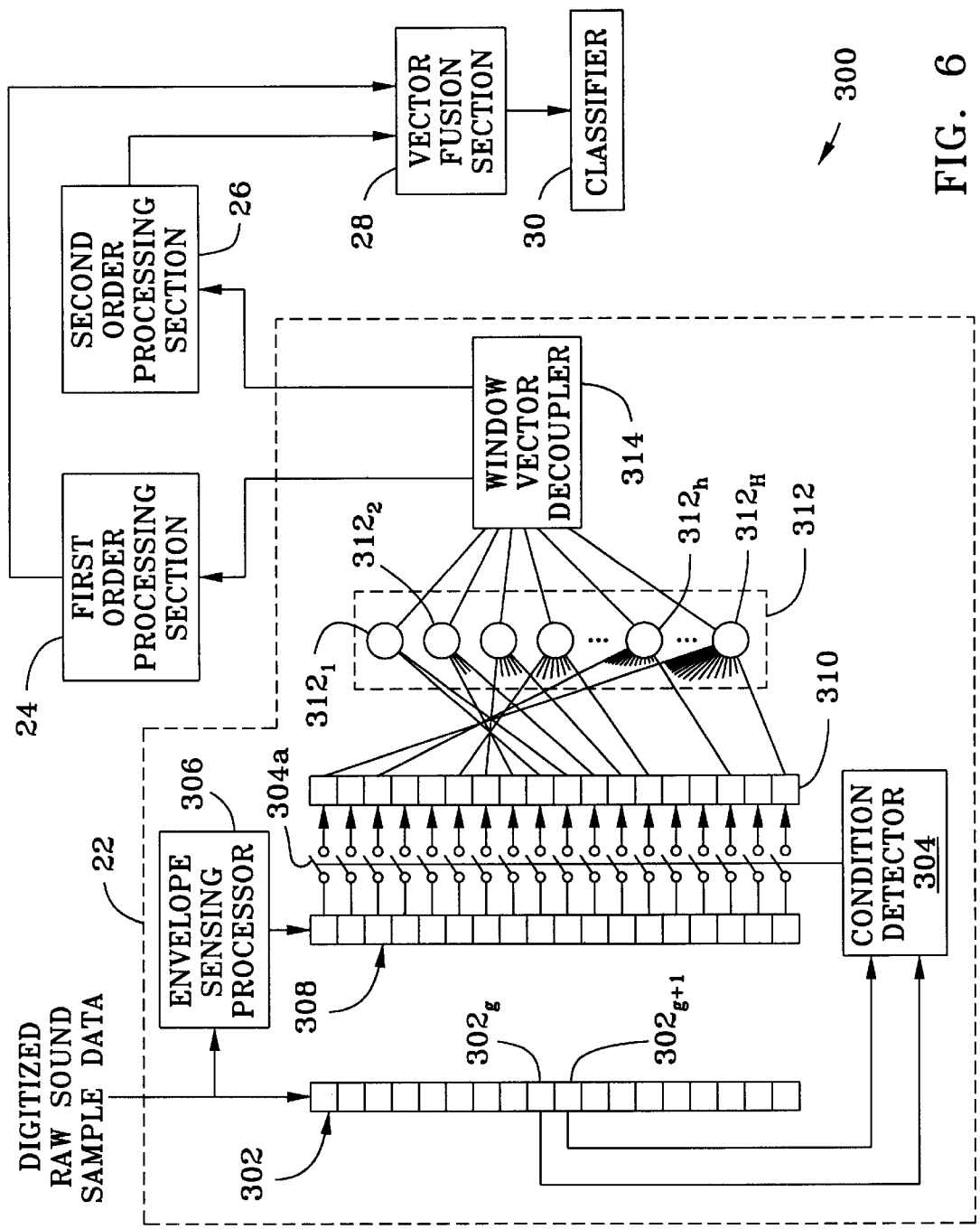
FIG. 6 is a neural schematic illustrating an envelope sensor embodiment of the present invention.

Referring now to FIG. 6, there is shown a schematic depiction of envelope sensor 300 particularly showing the configuration of pattern array former 22. The remaining components of envelope sensor 300 are as described for sound sensor 200 of FIG. 5. Envelope sensor 300 converts an instant of an envelope of sound into a multi-dimensional feature vector for recognition and classification. By way of background, envelope sensor 300 receives, as raw data, a sequence of sample data representing a amplitude changes of an acoustic signal, as in high-frequency components modulated by a low-frequency "envelope" signal, and generates feature vectors which contain information as to the structure of the "envelope" signal. Pattern array former 22 of envelope sensor 300 comprises acoustic signal shift register 302, condition detector 304, envelope sensing processor 306, envelope signal shift register 308, envelope window register 310, windows array network 312 and window vector decoupler 314. Acoustic signal shift register 302 and condition detector 304 operate on a sequence of data samples representing the amplitude of the acoustic signal over a period of time in the manner of shift register 202 and condition detector 204 of sound sensor 200 of FIG. 5. The raw data samples are also input to envelope sensing processor 306 which in turn provides a data signal representing the amplitude of the envelope signal to envelope signal shift register 308. The inputs to shift registers 302 and 308 are synchronized such that they represent signals over the same period of time. When condition detector 304 detects the selected criteria, as described above for condition detector 204 of sound sensor 200, the data in envelope signal shift register 308 is transferred in parallel, as symbolized by series of switches 304a, to envelope window register 310.

Envelope window register 310 is coupled to windows array network 312. Each element of windows array network 312 receives all envelope signal data between two registers of envelope window register 310 symmetrically disposed about the location in envelope window register 310 corresponding to the location of envelope condition detector 304 in acoustic signal shift register 302. For example, if envelope condition detector 304 operates on registers $302_g$ and $302_{g+1}$ of shift register 302, then first element $312_1$ of windows array network 312 would receive envelope signal data from registers $310_g$ and $310_{g+1}$ of envelope signal shift register 310; second element $312_2$ would receive envelope signal data from registers $310_{g-1}$ through $310_{g+2}$; and, generally, element $312_1$ would receive envelope signal data from registers $310_{g-h+1}$ through $310_{g+h}$ and so forth until all "H" elements of windows array network 312 are filled. It can be seen that the number of registers "G" of envelope signal register 310 must be greater than the number of elements "H" of windows array network 312 in order that windows array network 312 is properly filled.

Each element $312_h$ of the windows array network 312 generates an output which is a selected function of its input values and is weighted so as to normalize the outputs to a selected discrete time noise signal window shape. For example, the selected function may be an inverse of the number of registers "G" and the selected window shape may correspond to a square window, a Hamming window, a cosine to a power, or other window shape split about the locations corresponding to registers $310_g$ and $310_{g+1}$. In a separate embodiment, windows array network 312 is replaced with an array of window neural directors, one neural director corresponding to each element $312_h$ and having the same input dimension as its corresponding element. All the window neural directors would have the same output dimension. Such a neural director array will result in an output of a vector of "H" vectors as compared to a vector of "H" elements resulting from windows array network 312. The added information provides an increased sensitivity to the envelope shape by providing not only the magnitude information for each window but also the slope characteristics under each window.

The outputs of window array network 312 are coupled to vector decoupler 314, which operates as described for vector decoupler 44 of FIG. 2. The outputs of vector decoupler 314 correspond to window register 206 of FIG. 5 and are thus provided to first and second order processing sections 24 and 26. As with sound sensor 200 of FIG. 5, envelope sensor 300 performs the above-described operations repetitively, whenever envelope condition detector 304 determines that the sound sample data in acoustic signal shift register 302 satisfies the selected criteria.

The invention as described herein provides a number of advantages. In particular, it provides a sensor architecture for a variety of types of sensors which can generate an output feature pattern from input data without training or learning as would be required for a conventional neural network. The neural sensor of the present invention increases the input pattern's spatial features to a higher dimension. Neural sensor nonlinearity is caused by the input pattern dependent "paths" through the neural sensor generating a unique feature vector direction in a multidimensional space. The specific direction of the feature vector represents a pattern classification. The nonlinearity introduced in the neural sensor of the present invention provides additional discrimination of the input pattern's spatial features. When an input pattern is processed through the neural sensor of the present invention prior to being input to a trainable neural network, the resultant higher dimensionality and nonlinearity allow faster learning in the trainable neural network. Since the neural sensors of the present invention provide increased discrimination in the spatial features of the input pattern, preprocessing, such as by a Fourier transform, is not required.

A number of other advantages are provided for the particular embodiments described. In the virtual retina embodiment, identical but scale, or size varied images produce the same feature vector direction. Similar images with fine structural differences can be discriminated, thus a high resolution of an image can be sensed. In the sound sensor and envelope sensor embodiments, identical responses are provided for changing energy levels over a wide dynamic range. The sound sensor embodiment also provides high sensitivity for discriminating between same frequency tones that contain different timbre, e.g., middle C of various musical instruments.

It will be appreciated that sensors of similar architecture may be used in connection with recognition of patterns in other types of data organized in one, two or higher-dimensional arrays, such as may be generated by tactile sensors, thermal sensors and the like.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A neural sensor for generating a classification identifier for an input pattern, the neural sensor comprising:

a pattern array former receiving raw input pattern data and organizing the raw input pattern data into an input pattern array;

a first order processing section receiving the input pattern array and generating a first order feature vector illustrative of first order features of the input pattern array;

a second order processing section receiving the input pattern array and generating at least one second order feature vector illustrative of gradients in the input pattern array;

a vector fusion section receiving the first and second order feature vectors and generating a single fused feature vector;

a pattern classifier receiving the fused feature vector and generating the classification identifier for the input pattern array;

a first order amplifier within the first order processing section multiplying the first order feature vector by a first complimentary gain ratio; and a second order amplifier within the second order processing section multiplying the second order feature vector by a second complimentary gain ratio.

2. The neural sensor of claim 1 wherein the vector fusion section further comprises a vector decoupler receiving the first and second order feature vectors, obtaining an average component value of all elements of each feature vector and subtracting the average component value of each feature vector from the component value of each element of each feature vector.

3. The neural sensor of claim 1 wherein the vector fusion section further comprises a vector normalizer receiving the fused feature vector in a non-normalized state, obtaining a square root of a sum of squares of component values of all elements of the non-normalized fused feature vector and inversely adjusting the component value of each of the elements of the non-normalized fused feature vector in relation to the square root of the sum to obtain normalized component values for corresponding elements of the fused feature vector.

4. The neural sensor of claim 1 wherein the second order processing section further comprises a gradient pattern processor receiving the input pattern array and generating gradient vectors reflecting selected differences between elements of the input pattern array.

5. The neural sensor of claim 1 wherein the pattern array former comprises an array of photo transducers converting optical raw input data into the pattern array, the pattern array corresponding to an array of pixels forming a visual image, the pattern array former further dividing the array of pixels into a selected number of equal radial sectors having a common point at a central pixel of the image.

6. The neural sensor of claim 5 wherein the first order processing section further comprises a spatial sum neural network having a plurality of summing neurons each corresponding to one of the sectors, each summing neuron summing activities of all pixels in the corresponding sector through weighted connections in which weighted values are based on a relation of a position of the pixel in the corresponding sector with respect to the central pixel, the summing neurons generating a sector value for each sector, the spatial sum neural network forming a sector array from the sector values, the first order processing section generating the first order feature vector from the sector array.

7. The neural sensor of claim 5 wherein the second order processing section further comprises:
a window difference network generating a gradient vector for each pixel, each gradient vector having a plurality of elements corresponding to a selected number of surrounding pixels, each element having a value reflecting a selected difference between the each pixel and one of the surrounding pixels;
an array of window neural directors, each window neural director receiving one of the gradient vectors and generating a gradient feature vector for each pixel, elements of the gradient feature vectors corresponding to feature layers such that corresponding feature layers are populated with values of corresponding elements from each gradient feature vector for each pixel; and
a spatial sum neural network array, each spatial sum neural network having a plurality of summing neurons each corresponding to one of the sectors, each summing neuron summing activities of all pixels in the corresponding sector through weighted connections in which weighted values are based on a relation of a position of the pixel in the corresponding sector with respect to the central pixel, the summing neurons generating a sector value for each sector, each spatial sum neural network forming a sector array from the sector values, the second order processing section generating the second order feature vectors from the sector arrays.

8. The neural network of claim 1 wherein the pattern array former comprises:
a shift register having a plurality of data registers, the shift register receiving a stream of digitized raw sound data samples, the shift register moving the data samples sequentially through the data registers, an oldest data sample exiting the shift register as a new data sample is received; and
a condition detector testing data samples from two adjacent data registers to determine if selected criteria is met, the condition detector forming the pattern array from the data samples within the data registers when the selected criteria is met.

9. The neural sensor of claim 8 wherein the second order processing section further comprises a difference neural network array, each difference neural network receiving a selected number of consecutive data sample values of the pattern array and generating a gradient vector having elements corresponding to the consecutive data sample values, each element reflecting a difference between the corresponding data sample value and a reference data sample value chosen from one of the selected number of data sample values, the second order processing section generating the second order feature vectors from the gradient vectors.

10. The neural sensor of claim 1 wherein the pattern array former comprises:
a shift register having a plurality of data registers, the shift register receiving a stream of digitized raw sound data samples corresponding to an amplitude of a sound signal, the shift register moving the data samples sequentially through the data registers, an oldest data sample exiting the shift register as a new data sample is received;
a plurality of envelope registers, each envelope register corresponding to a data register, each envelope register receiving envelope data corresponding to an amplitude of an envelope signal bounding the sound signal data sample within the corresponding data register; and
a condition detector testing data samples from two adjacent data registers to determine if selected criteria is met, the pattern array former forming the pattern array from the envelope data within the envelope registers when the selected criteria is met.

11. The neural sensor of claim 10 wherein the pattern array former further comprises:
a windows array network having a plurality of neurons, each neuron receiving envelope data from envelope registers symmetrically disposed a distance about envelope registers corresponding to the two adjacent data registers, the distance corresponding to a position of the neuron in the windows array network, each neuron generating a function of the envelope register data received as an output, each neuron further weighting its output in concert with other neurons of the windows array network so as to normalize the outputs to a predetermined window shape; and
a window vector decoupler receiving the outputs, obtaining an average value of all outputs, subtracting the average value from each output to obtain a result and populating elements of the pattern array with the results.

12. The neural sensor of claim 11 wherein the second order processing section further comprises a difference neural network array, each difference neural network receiving results from a selected number of consecutive pattern array elements and generating a gradient vector having gradient elements corresponding to the consecutive pattern array elements, each gradient element reflecting a difference between the corresponding pattern array element and a reference pattern array element chosen from one of the selected pattern array elements, the second order processing section generating the second order feature vectors from the gradient vectors.

13. A neural sensor for classifying optical input data comprising:
an array of photo transducers converting the optical input data into an array of pixels forming a visual image;
a pattern array former further dividing the array of pixels into a selected number of equal radial sectors having a common point at a central pixel of the image;
a first spatial sum neural network having a plurality of first summing neurons each corresponding to one of the sectors, each first summing neuron summing activities of all pixels in the corresponding sector through weighted connections in which weighted values are based on a relation of a position of the pixel in the corresponding sector with respect to the central pixel, the first summing neurons generating a first sector value for each sector, the first spatial sum neural network forming a first sector array from the first sector values;

a first neural director generating a first order feature vector from the first sector array;

a window difference network generating a gradient vector for each pixel, each gradient vector having a plurality of elements corresponding to a selected number of surrounding pixels, each element having a value reflecting a selected difference between the each pixel and one of the surrounding pixels;

an array of window neural directors, each window neural director receiving one of the gradient vectors and generating a gradient feature vector for each pixel, elements of the gradient feature vectors corresponding to feature layers such that corresponding feature layers are populated with values of corresponding elements from each gradient feature vector for each pixel; and an array of second spatial sum neural networks, each second spatial sum neural network corresponding to one of the feature layers, each second spatial sum neural network having a plurality of second summing neurons each corresponding to one of the sectors, each second summing neuron summing activities of all pixels in the corresponding sector through weighted connections in which weighted values are based on a relation of a position of the pixel in the corresponding sector with respect to the central pixel, the second summing neurons generating a second sector value for each sector, each second spatial sum neural network forming a second sector array from the second sector values;

an array of second neural directors corresponding to the array of second spatial sum neural networks, each second neural director generating a second order feature vector from the corresponding second sector array; and a classifier receiving and fusing the first and second order feature vectors to generate a classification identifier for the optical input data.

14. A neural sensor for classifying digitized sound input data comprising:

a shift register having a plurality of data registers, the shift register receiving a stream of digitized sound data samples, the shift register moving the data samples sequentially through the data registers, an oldest data sample exiting the shift register as a new data sample is received;

a condition detector testing data samples from two adjacent data registers to determine if selected criteria is met, the condition detector forming a pattern array from the data samples within the data registers when the selected criteria is met;

a first neural director receiving the pattern array and generating a first order feature vector;

a difference neural network array, each difference neural network receiving a selected number of consecutive pattern array element values of the pattern array and generating a gradient vector having gradient elements corresponding to the consecutive pattern array element values, each gradient element reflecting a difference between the corresponding pattern array element value and a reference pattern array element value chosen from one of the selected pattern array element values;

an array of second neural directors corresponding to the neural network array, each second neural director generating a second order feature vector from the corresponding gradient vector; and a classifier receiving and fusing the first and second order feature vectors to generate a classification identifier for the sound input data.

15. The neural sensor of claim 14 wherein the sound data samples correspond to an amplitude of a sound signal.

16. The neural sensor of claim 15 further comprising:

a plurality of envelope registers, each envelope register corresponding to a data register, each envelope register receiving envelope data corresponding to an amplitude of an envelope signal bounding the sound signal data sample within the corresponding data register, the condition detector forming the pattern array from the envelope data within the envelope registers when the selected criteria is met;

a windows array network having a plurality of neurons, each neuron receiving envelope data from envelope registers symmetrically disposed a distance about envelope registers corresponding to the two adjacent data registers, the distance corresponding to a position of the neuron in the windows array network, each neuron generating a function of the envelope register data received as an output, each neuron further weighting its output in concert with other neurons of the windows array network so as to normalize the outputs to a predetermined window shape; and a window vector decoupler receiving the outputs, obtaining an average value of all outputs, subtracting the average value from each output to obtain a result and populating elements of the pattern array with the results.

* * * * *